United States Patent
Huang et al.

(10) Patent No.: US 8,365,357 B2
(45) Date of Patent: Feb. 5, 2013

(54) HINGE MECHANISM

(75) Inventors: Lian-Cheng Huang, Shenzhen (CN); Gui-Li Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 302 days.

(21) Appl. No.: 12/959,597

(22) Filed: Dec. 3, 2010

(65) Prior Publication Data

US 2011/0252602 A1 Oct. 20, 2011

(30) Foreign Application Priority Data

Apr. 15, 2010 (CN) .......................... 2010 1 0147461

(51) Int. Cl.
*E05F 1/08* (2006.01)

(52) U.S. Cl. .......................................... 16/303; 16/330
(58) Field of Classification Search .................. 16/303, 16/307, 321, 327, 328, 329, 330, 331, 332, 16/333, 334, 341, 343, 344, 345, 347
See application file for complete search history.

(56) References Cited

U.S. PATENT DOCUMENTS

| | | | | |
|---|---|---|---|---|
| 7,111,361 | B2 * | 9/2006 | Li et al. | 16/284 |
| 7,814,619 | B2 * | 10/2010 | Kuwajima et al. | 16/303 |
| 2005/0172454 | A1 * | 8/2005 | Chen et al. | 16/330 |
| 2005/0283946 | A1 * | 12/2005 | Huang | 16/330 |
| 2006/0112516 | A1 * | 6/2006 | Chen et al. | 16/330 |
| 2006/0117527 | A1 * | 6/2006 | Tu et al. | 16/303 |
| 2006/0117528 | A1 * | 6/2006 | Duan et al. | 16/303 |
| 2006/0117529 | A1 * | 6/2006 | Duan et al. | 16/303 |
| 2006/0179612 | A1 * | 8/2006 | Oshima et al. | 16/330 |
| 2007/0022569 | A1 * | 2/2007 | Luo | 16/330 |
| 2007/0089272 | A1 * | 4/2007 | Kuwajima et al. | 16/303 |
| 2008/0078062 | A1 * | 4/2008 | Hsu et al. | 16/367 |
| 2009/0133221 | A1 * | 5/2009 | Nakayama et al. | 16/328 |
| 2009/0300882 | A1 * | 12/2009 | Hayashi | 16/303 |
| 2011/0254417 | A1 * | 10/2011 | Duan et al. | 16/303 |

FOREIGN PATENT DOCUMENTS

CN 2706619 Y 6/2005

* cited by examiner

*Primary Examiner* — Jeffrey O Brien
(74) *Attorney, Agent, or Firm* — Altis Law Group, Inc.

(57) ABSTRACT

A hinge mechanism includes a pivot shaft, a resilient member coiling around the pivot shaft, a first cam, a second cam, and a rolling assembly. The pivot shaft defines a through hole in a radial direction thereof. The first cam and the second cam are sleeved on the pivot shaft, the first cam defines two pairs of recesses at one end surface thereof, and the second cam defines a groove at one end surface thereof facing the first cam. The rolling assembly positioned between the first cam and the second cam includes a pin and two rolling bearings sleeved on opposite ends of the pin.

16 Claims, 5 Drawing Sheets

HINGE MECHANISM

BACKGROUND

1. Technical Field

The present disclosure generally relates to hinge mechanisms, and more particularly to a hinge mechanism applied in an electronic device.

2. Description of Related Art

Many electronic devices include hinge mechanisms. A commonly used hinge mechanism generally includes a cam and a cam follower resisting the cam to ensure that one part of the electronic device is capable of rotating or being maintained in a plurality of predetermined positions relative to the other part. Thus, a changeable friction force is generated therebetween.

The cam forms one or more protrusions thereon, and the cam follower defines one or more corresponding recesses to receive the protrusions of the cam, allowing self-lock and changing of the friction force therebetween.

However, due to the relatively large friction force between the ends of the cam and the cam follower, both elements (cam and cam follower) deteriorate with use, thereby causing overall loosening of the hinge mechanism. Furthermore, ease of use is impaired by the larger amount of friction force therebetween.

Therefore, there is room for improvement within the art.

BRIEF DESCRIPTION OF THE DRAWINGS

The components in the drawings are not necessarily drawn to scale, the emphasis being placed upon clearly illustrating the principles of the present disclosure. Moreover, in the drawings, like reference numerals designate corresponding parts throughout several views, and all the views are schematic.

DETAILED DESCRIPTION

Figure 1:
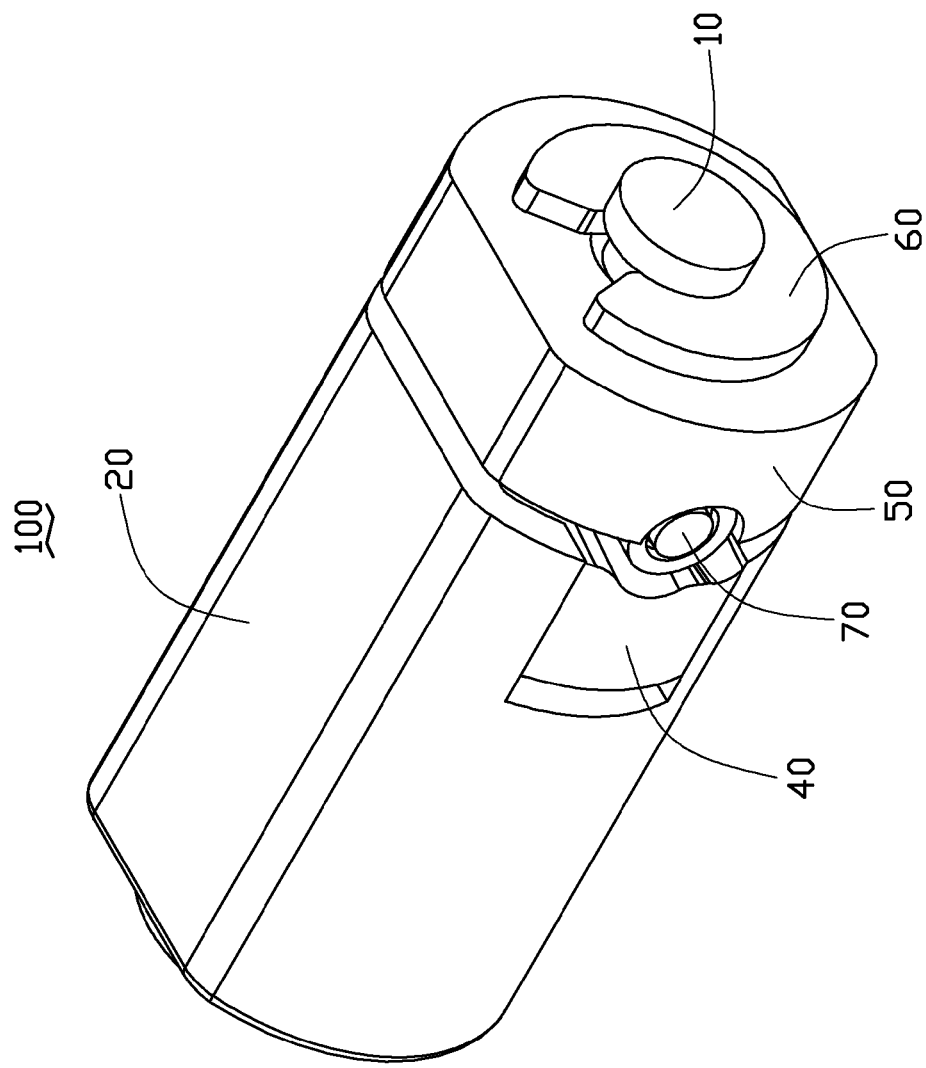
FIG. 1 is an assembled, isometric view of one embodiment of a hinge mechanism.
Figure 2:
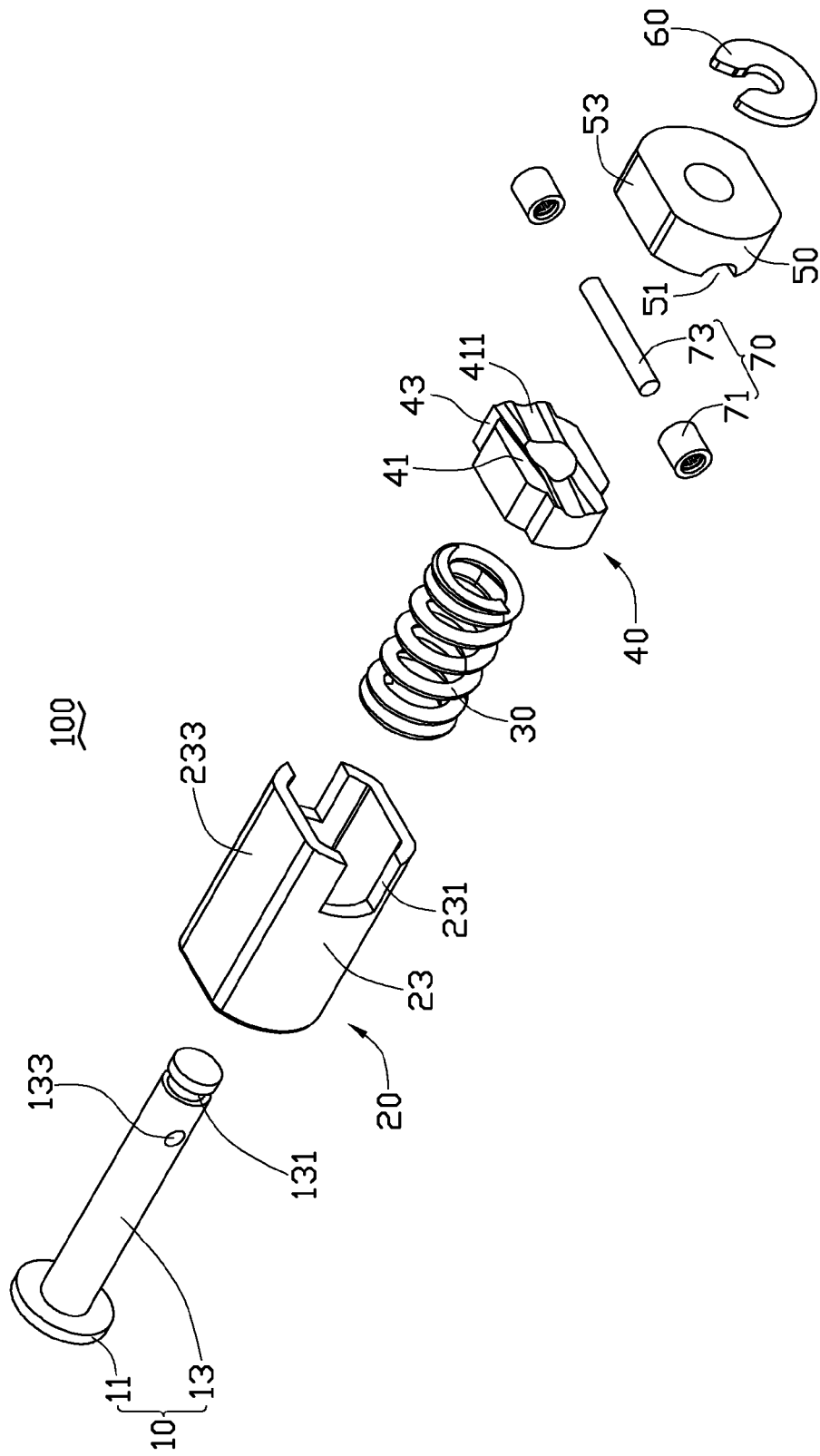
FIG. 2 is an exploded, isometric view of the hinge mechanism of FIG. 1, including a first cam and two rolling bearings.

Referring to FIGS. 1 and 2, one embodiment of a hinge mechanism 100 includes a pivot shaft 10, a sleeve 20, a resilient member 30, a first cam 40, a second cam 50, a holding member 60, and a rolling assembly 70. The resilient member 30, the first cam 40, the second cam 50, and the holding member 60 are sleeved on the pivot shaft 10 in that order. The sleeve 20 is sleeved on the resilient member 30 and the first cam 40, and the first cam 40 and the second cam 50 face each other. The rolling assembly 70 is positioned between the first cam 40 and the second cam 50.

The pivot shaft 10 includes an end flange 11 and a shaft portion 13 connected with each other. The shaft portion 13 defines a slot 131 adjacent to a distal end thereof and a through hole 133 in a radial direction thereof. The slot 131 extends around the shaft portion 13.

Figure 3:
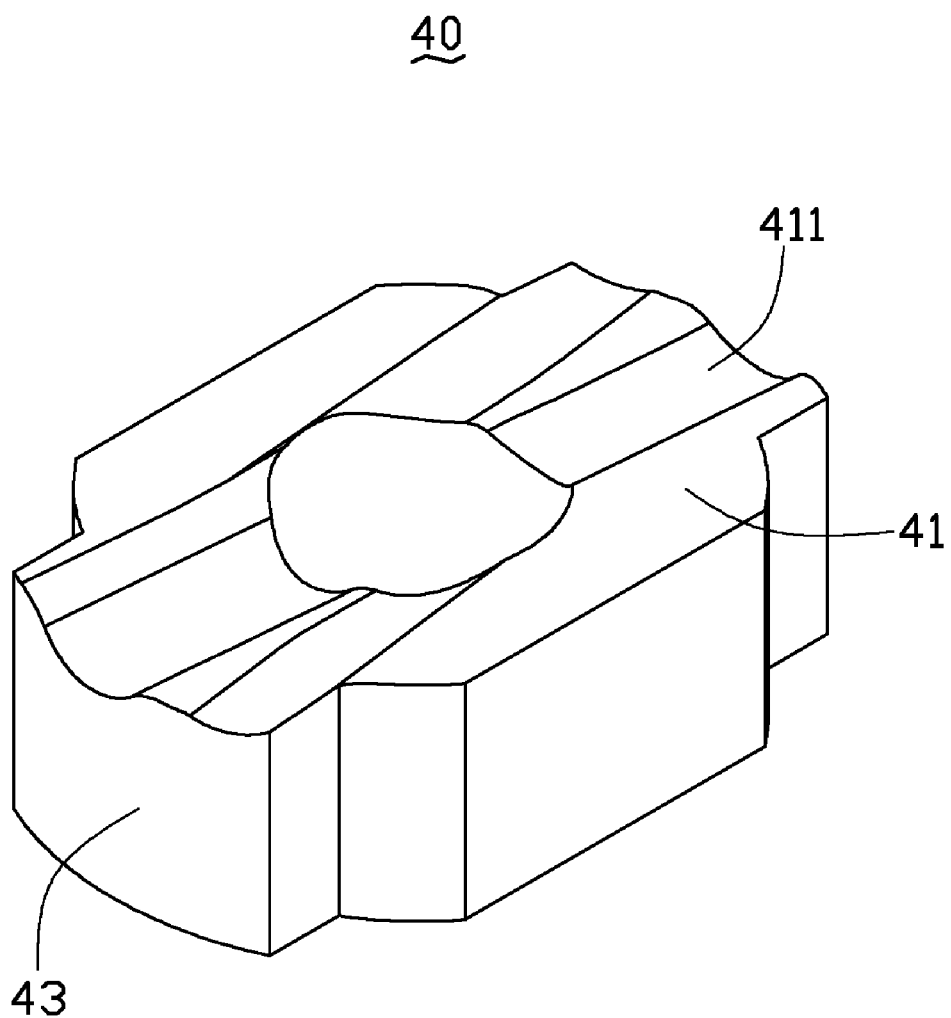
FIG. 3 is an isometric view of the first cam of FIG. 2.
Figure 4:
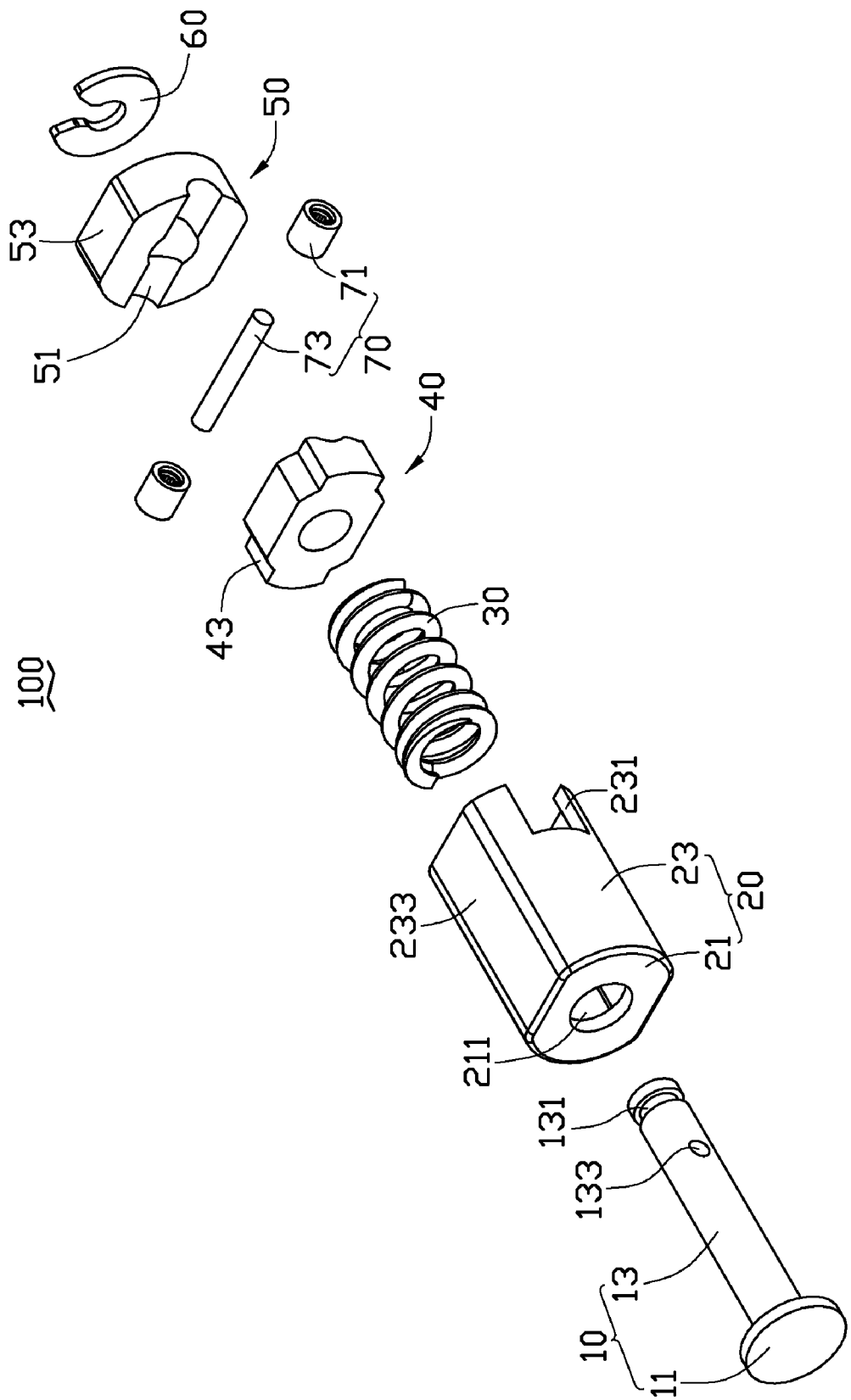
FIG. 4 is similar to FIG. 2, but viewed from another aspect.

Also referring to FIGS. 3 and 4, the sleeve 20 includes a bottom wall 21 and a tubular sidewall 23 extending from a circumference (not labeled) of the bottom wall 21. The bottom wall 21 defines a shaft hole 211. The sidewall 23 defines two latching cutouts 231 and includes two stopping portions 233. The latching cutouts 231 are recessed from an end of the sidewall 23 away from the bottom wall 21, and the stopping portions 233 are formed on opposite sides of the sidewall 23. The latching cutouts 231 are defined in different sides away from the stopping portions 233. Alternatively, the sidewall 23 of the sleeve 20 may define one or more than two latching cutouts 231.

In the illustrated embodiment, the resilient member 30 is a compression helical spring, and alternatively, the resilient member 30 can be a plurality of elastic plates or an elastic sleeve.

The first cam 40 includes an end surface 41 and two latching portions 43, and the two latching portions 43 are corresponding to the latching cutouts 231 of the sleeve 20. In the illustrated embodiment, the first cam 40 defines two pairs of recesses 411 recessed from the end surface 41, and the recesses 411 of a same pair are adjacent to each other and have different depths. The latching portions 43 are a plurality of protrusions protruding from opposite sides of the first cam 40. Alternatively, the first cam 40 can define one, two, or other number of recesses 411. The latching portions 43 can be a plurality of hooks or other form, and the first cam 40 may include one or more than two latching portions 43, with the number of the latching cutouts 231 of the sleeve 20 corresponding thereto.

The second cam 50 defines a groove 51 and includes two stopping side surfaces 53 on opposite sides thereof. The groove 51 is recessed from one end surface of the second cam 50 facing the first cam 40. The stopping side surfaces 53 correspond to the stopping portions 233 of the sleeve 20.

In the illustrated embodiment, the holding member 60 is a snap ring, but can alternatively be a fastener, with the pivot shaft 10 defining a threaded portion at a distal end of the shaft portion 13 correspondingly.

Figure 5:
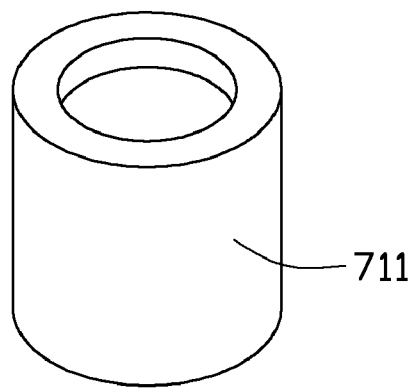
FIG. 5 is an exploded, isometric view of one rolling bearing of FIG. 2.
Figure 5:
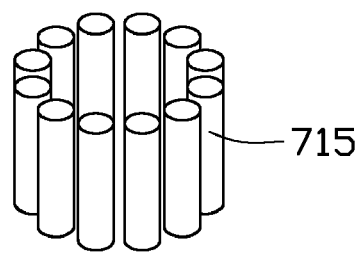
Figure 5:
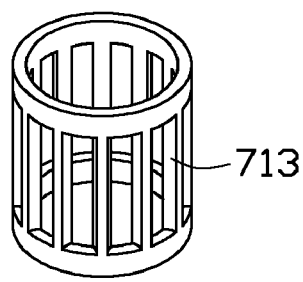

Also referring to FIG. 5, the rolling assembly 70 includes two rolling bearings 71 and a pin 73. The rolling bearings 71 are sleeved on opposite ends of the pin 73. Each rolling bearing 71 includes an outer ring 711, a cage 713 including a plurality of cage pockets (not labeled), and a plurality of rollers 715 received in the cage pockets of the cage 713, respectively. The radius of each rolling bearing 71 is less than a depth of the groove 51 of the second cam 50 recessed from a surface of the second cam 50 facing the first cam 40, and the diameter of each rolling bearing 71 exceeds a width of the groove 51 in the end surface of the second cam 50 facing the first cam 40. In the illustrated embodiment, the rolling bearings 71 are a plurality of needle roller bearings, and the rollers 715 are a plurality of needle rollers. Alternatively, the rolling bearings 71 can be a plurality of insert bearings, deep groove ball bearings, or other radial bearings. The rolling assembly 70 may include one rolling bearing 71 sleeved on one end of the pin 73, or a plurality of pairs of the rolling bearings 71 such that the plurality of rolling bearings 71 are sleeved on portions adjacent to opposite ends of the pin 73.

During assembly of the hinge mechanism 100, the resilient member 30 and the first cam 40 are received in the sleeve 20, and the latching portions 43 of the first cam 40 are latched with the latching cutouts 231 of the sleeve 20. The shaft portion 13 of the pivot shaft 10 passes through the shaft hole 211 of the sleeve 20, the resilient member 30, the first cam 40, and the second cam 50 in that order. The pin 73 of the rolling assembly 70 passes or penetrates through the through hole 133 of the shaft portion 13 and is received in the groove 51 of the second cam 50. The rolling bearings 71 are sleeved on opposite ends of the pin 73 and partially received in the groove 51 of the second cam 50. The holding member 60 is sleeved on the shaft portion 13 and engages with the slot 131 thereof.

In the hinge mechanism 100, the first cam 40 is rotatably sleeved on the shaft portion 13 of the pivot shaft 10, and the pin 73 of the rolling assembly 70 is non-rotatable relative to the pivot shaft 10, thus the pin 73 acts as an inner ring for each rolling bearing 71 sleeved thereon.

In use, the second cam 50 and the rolling assembly 70 rotate with the pivot shaft 10, and the sleeve 20 and the first cam 40 rotate relative to the pivot shaft 10. The resilient member 30 exerts a resisting force on the first cam 40, such that the first cam 40 resists the rolling bearings 71 of the rolling assembly 70. During the rotation of the hinge mechanism 100, the end surface 41 resists the rolling bearings 71 of the rolling assembly 70, such that the rolling bearings 71 are received in or out of the recesses 411 of the first cam 40. Therefore, the axial force between the elements sleeved on the pivot shaft 10 is changeable during rotation. When the rolling bearings 71 are received in the recesses 411 of the first cam 40, the hinge mechanism 100 can maintain a predetermined rotation angle. Further, because the recesses 411 have different depths, the axial force is changeable when the rolling bearings 71 are received in different recesses 411.

In the hinge mechanism 100, the rotation friction is generated between the first cam 40 and the second cam 50. The rotation friction is less than the sliding friction, thereby the first cam 40 and the second cam 50 are minimized or prevented from abrading over time, and in addition, the elements of the hinge mechanism 100 remain snugly aligned. Ease of use is further enhanced by the smooth rotation of the rolling bearings 71 between the first cam 40 and the second cam 50.

Since the depth of the groove 51 of the second cam 50 recessed from the end surface facing the first cam 40 exceeds the radius of the rolling bearings 71, and the width of the groove 51 in the surface of the second cam 50 facing the first cam 40 is less than the diameter of the rolling bearings 71, thus the rolling bearings 71 are held in the groove 51 securely.

Because the stopping side surfaces 53 correspond to the stopping portions 233 of the sleeve 20, a profile of the hinge mechanism 100 is consistent.

Alternatively, the second cam 50 may not define any groove 51, whereby the rolling assembly 70 is held between the first cam 40 and the second cam 50. The sleeve 20 may be omitted, and the first cam 40 can be connected to one part of an electronic device (not shown).

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge mechanism, comprising:
a pivot shaft defining a through hole in a radial direction of the pivot shaft;
a resilient member coiling around the pivot shaft;
a first cam rotatably sleeved on the pivot shaft and defining at least one recess at one end of the first cam;
a second cam sleeved on the pivot shaft and defining a groove at one end of the second cam facing the first cam; and
a rolling assembly comprising a pin and at least one rolling bearing sleeved on the pin, wherein the pin penetrates the through hole of the pivot shaft and is received in the groove of the second cam, and the at least one rolling bearing is partially received in the groove of the second cam;
wherein a depth of the groove of the second cam recessing from a surface facing the first cam exceeds the radius of the at least one rolling bearing, and a width of the groove in the surface of the second cam facing the first cam is less than the diameter of the at least one rolling bearing.

2. The hinge mechanism of claim 1, wherein the first cam defines at least one pair of recesses, and the at least one pair of the recesses adjacent to each other have different depths.

3. The hinge mechanism of claim 2, wherein the at least one rolling bearing comprises two rolling bearings which are sleeved on opposite ends of the pin, and the first cam defines two pairs of recesses.

4. The hinge mechanism of claim 1, further comprising a sleeve sleeved on the resilient member and the first cam, wherein the first cam forms at least one latching portion, and the sleeve defines at least one latching cutout in which the at least one latching portion is received.

5. The hinge mechanism of claim 4, wherein the sleeve comprises two stopping portions on opposite sides of the sleeve.

6. The hinge mechanism of claim 5, wherein the second cam comprises two stopping side surfaces, and the stopping side surfaces are corresponding to the stopping portions of the sleeve.

7. The hinge mechanism of claim 4, wherein the sleeve further comprises a bottom wall and defines a shaft hole in the bottom wall, and the pivot shaft comprises an end flange resisting the bottom wall of the sleeve and a shaft portion passing through the shaft hole of the sleeve.

8. The hinge mechanism of claim 7, wherein the shaft portion defines a slot adjacent to a distal end of the shaft portion of the pivot shaft, and the hinge mechanism further comprises a holding member engaging with the slot of the pivot shaft.

9. A hinge mechanism, comprising:
a pivot shaft defining a through hole in a radial direction of the pivot shaft;
a resilient member coiling around the pivot shaft;
a first cam rotatably sleeved on the pivot shaft and defining at least one recess at one end of the first cam;
a second cam non-rotatably sleeved on the pivot shaft and defining a groove at one end of the second cam facing the first cam; and
a rolling assembly comprising a pin and at least one rolling bearing sleeved on the pin, wherein the pin penetrates the through hole of the pivot shaft and the at least one rolling bearing is held between the first cam and the second cam to engage with the at least one recess and the groove;
wherein a depth of the groove of the second cam recessing from a surface of the second cam facing the first cam exceeds the radius of the at least one rolling bearing, and a width of the groove in the surface of the second cam facing the first cam is less than the diameter of the at least one rolling bearing, the in is received in the groove and the at least one rolling bearing is partially received in the groove.

10. The hinge mechanism of claim 9, wherein the first cam defines at least one pair of recesses, and the at least one pair of the recesses adjacent to each other have different depths.

11. The hinge mechanism of claim 10, wherein the at least one rolling bearing comprises two rolling bearings which are sleeved on opposite ends of the pin, and the first cam defines two pairs of recesses.

12. The hinge mechanism of claim 9, further comprising a sleeve sleeved on the resilient member and the first cam, wherein the first cam forms at least one latching portion, and the sleeve defines at least one latching cutout in which the at least one latching portion is received.

13. The hinge mechanism of claim 12, wherein the sleeve comprises two stopping portions on opposite sides of the sleeve.

14. The hinge mechanism of claim 13, wherein the second cam comprises two stopping side surfaces, and the stopping side surfaces are corresponding to the stopping portions of the sleeve.

15. The hinge mechanism of claim 12, wherein the sleeve further comprises a bottom wall and defines a shaft hole in the bottom wall, and the pivot shaft comprises an end flange resisting the bottom wall of the sleeve and a shaft portion passing through the shaft hole of the sleeve.

16. The hinge mechanism of claim 15, wherein the shaft portion defines a slot adjacent to a distal end of the shaft portion of the pivot shaft, and the hinge mechanism further comprises a holding member engaging with the slot of the pivot shaft.

* * * * *